United States Patent
Hayakawa

(10) Patent No.: US 9,030,493 B2
(45) Date of Patent: May 12, 2015

(54) IMAGE PROCESSING SYSTEM, METHOD AND APPARATUS, AND COMPUTER-READABLE MEDIUM RECORDING IMAGE PROCESSING PROGRAM

(75) Inventor: Takeshi Hayakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 220 days.

(21) Appl. No.: 13/405,746

(22) Filed: Feb. 27, 2012

(65) Prior Publication Data

US 2012/0218300 A1 Aug. 30, 2012

(30) Foreign Application Priority Data

Feb. 25, 2011 (JP) ................................. 2011-040967

(51) Int. Cl.
| | |
|---|---|
| *G09G 5/00* | (2006.01) |
| *A63F 13/20* | (2014.01) |
| *G06T 19/00* | (2011.01) |
| *A63F 13/40* | (2014.01) |

(52) U.S. Cl.
CPC ............... *A63F 13/06* (2013.01); *G06T 19/006* (2013.01); *A63F 13/10* (2013.01); *A63F 2300/1093* (2013.01); *A63F 2300/6045* (2013.01)

(58) Field of Classification Search
CPC ................. G06G 5/14; G06G 2340/10; G06G 2340/125; G06T 11/60; G06T 15/503; G06T 7/0044; G06T 19/006
See application file for complete search history.

(56) References Cited

U.S. PATENT DOCUMENTS

| | | | |
|---|---|---|---|
| 2006/0071946 A1* | 4/2006 | Anabuki et al. ................ | 345/633 |
| 2008/0199106 A1* | 8/2008 | Akatsuka et al. ............. | 382/305 |
| 2008/0292131 A1 | 11/2008 | Takemoto et al. | |
| 2009/0245681 A1* | 10/2009 | Kobayashi ..................... | 382/275 |
| 2011/0228103 A1 | 9/2011 | Takemoto et al. | |
| 2012/0078510 A1* | 3/2012 | Ma et al. ....................... | 701/426 |
| 2013/0265393 A1 | 10/2013 | Takemoto et al. | |

FOREIGN PATENT DOCUMENTS

| | | |
|---|---|---|
| JP | 2008-46687 A | 2/2008 |
| JP | 2008-139911 A | 6/2008 |
| JP | 2009-157526 A | 7/2009 |

OTHER PUBLICATIONS

Hirokazu et al., "An Augmented Reality System and its Calibration based on Marker Tracking", TVRSJ, 1999, vol. 4, No. 4,11 pages, with a partial English translation.

Yuko Uematsu et al., "On-line Augmented Reality System by Integration of Multiple Planar Markers Placed in Arbitrary Positions and Directions," *Journal of Information and Media Studies*, Jun. 1, 2006, pp. 909-919, vol. 80, No. 6 (w/ English abstract).

* cited by examiner

*Primary Examiner* — Charles Tseng
(74) *Attorney, Agent, or Firm* — Nixon & Vanderhye P.C.

(57) ABSTRACT

An example image processing apparatus has a captured image acquisition unit for acquiring a captured image captured by an imaging device, a feature detection unit for detecting the markers from the captured image, a reference acquisition unit for acquiring, based on each of the detected markers, a coordinate system serving as a reference indicating a position and attitude in a space, and a relative relation information acquisition unit for acquiring, based on the captured image in which a plurality of the markers are detected, relative relation information indicating a relative relation in position and attitude of a plurality of coordinate systems acquired for the respective markers.

10 Claims, 11 Drawing Sheets

IMAGE PROCESSING SYSTEM, METHOD AND APPARATUS, AND COMPUTER-READABLE MEDIUM RECORDING IMAGE PROCESSING PROGRAM

This application is based upon and claims the benefit of priority of the prior Japanese Patent Application No. JP2011-40967, filed on Feb. 25, 2011, the entire contents of which are incorporated herein by reference.

FIELD

This disclosure relates to an image processing system, an image processing method, an image processing apparatus, and a medium on which an image processing program is recorded.

BACKGROUND AND SUMMARY

According to a conventional augmented reality technology, a virtual object is additively displayed in correspondence with a marker in a real space imaged with a camera.

However, when processing on position and attitude is performed on the basis of the marker in the real space according to the conventional augmented realty technology, the processing relies on a single marker used as the reference, and thus the flexibility of the processing is low.

An example of an information processing program according to this disclosure is an image processing system including a component marked with a feature whose position and attitude relative to an imaging device can be specified by being imaged by the imaging device, and an image processing apparatus connected to the imaging device. The image processing apparatus includes: captured image acquisition means for acquiring a captured image captured by the imaging device; feature detection means for detecting the feature from the captured image; reference acquisition means for acquiring a position/attitude reference based on the detected feature, the reference being used as a reference for indicating a position and attitude in a space imaged by the imaging device; and relative relation information acquisition means for acquiring, based on the captured image from which the feature is detected in plurality, relative relation information indicating a relative relation in position and attitude among the plurality of position/attitude references acquired for the respective features.

In this disclosure, the feature whose position and attitude relative to the imaging device can be specified is, specifically, a so-called AR marker or a code such as a two-dimensional bar code. Such a feature may be applied to a component such as a card.

The position/attitude reference is a reference indicating a position and attitude in an imaged space. The position/attitude reference may be a coordinate system in which the origin and three axes are defined according to the position and attitude of the marker, or position/attitude information of the marker relative to the imaging device.

The relative relation information is information indicating a relative relation in position and attitude among the plurality of position/attitude references. The relative relation information may be a conversion matrix used for performing coordinate conversion between the coordinate systems as the position/attitude references.

By having the means describes above, the image processing system according to this disclosure is able to acquire relative relation information indicating a relative relation in position and attitude among the plurality of the position/attitude references.

This makes it possible to improve the flexibility of processing when the processing is performed for position and attitude while using a feature such as a so-called AR marker as the reference.

The image processing apparatus may further include estimation means for estimating, based on the relative relation information and one of the plurality of position/attitude references related to the relative relation information, another one of the position/attitude references.

The provision of this estimation means makes it possible to obtain a position/attitude reference by estimation from another position/attitude reference, whereby the processing flexibility can be improved.

For example, in order to perform processing based on a plurality of markers according to a conventional technique, these markers are imaged such that all of them are within the imaging range of an imaging device. Therefore, these markers need be simultaneously positioned within the imaging range of the imaging device, which narrows the moveable range of the imaging device and causes inconvenience to a user. However, the image processing apparatus according to this disclosure is provided with estimation means, which eliminates the need of positioning all the markers within the imaging range, and hence the flexibility in movement of the imaging device can be improved.

The image processing apparatus may further include storage means for storing the relative relation information.

The image processing apparatus may further includes: determination means for determining whether or not the relative relation information acquired by the relative relation information acquisition means is relative relation information corresponding to the relative relation information stored in the storage means; and update means for updating the stored relative relation information using the acquired relative relation information, when it is determined by the determination means that the acquired relative relation information is relative relation information corresponding to the stored relative relation information.

The provision of such update means makes it possible, if the position where a feature is arranged is changed or an error occurs in calculation of position and attitude of the feature, to keep the stored relative relation information updated and to enable it to follow the movement of the feature.

The image processing apparatus may further include addition means for storing the acquired relative relation information in the storage means when it is not determined by the determination means that the acquired relative relation information is relative relation information corresponding to the stored relative relation information.

The provision of such addition means makes it possible, even if a feature added, to keep the stored relative relation information updated and to enable it to follow the addition of the feature.

The image processing apparatus may further include deletion means for deleting the relative relation information satisfying a predetermined condition from the storage means.

The provision of such deletion means makes it possible to keep the stored relative relation information updated, even if the feature is removed, or the use of a feature as a position/attitude reference is halted during the course of processing.

The image processing apparatus may further include rendering means for rendering a virtual space image by arranging a virtual camera in a virtual space, arranging, in the virtual space, a virtual object whose position and attitude are determined according to the position/attitude reference, and generating an image of the virtual space as viewed from the virtual camera.

The image processing apparatus may further include display control means for generating a composite image by overlapping the image of the virtual space with the captured image and causing a display device to display the composite image.

The image processing apparatus may further include processing means for performing predetermined processing so that time in the virtual space advances with passage of real time.

This disclosure can be considered as a method implemented by a computer, or a program executed by a computer.

This disclosure may be a recording medium on which such a program is recorded and which is readable by a computer or the like. The recording medium readable by a computer or the like herein means a recording medium which stores information such as data or a program by means of an electrical, magnetic, optical, mechanic, or chemical effect such that the stored information can be read by a computer or the like.

DETAILED DESCRIPTION OF NON-LIMITING EXAMPLE EMBODIMENTS

Exemplary preferred embodiments of this disclosure include an image processing system, an image processing method, an image processing apparatus, and a medium on which an image processing program is recorded. These embodiments will be described with reference to the accompanying drawings. It should be noted that the embodiments described below are illustrative only, in order to describe, for example, how the program according to this disclosure is executed, and it is not intended to limit the program or the like according to this disclosure to specific configurations described below. In order to execute the program or the like according to this disclosure, other specific configurations may be employed as appropriate according to the embodiments.

<System Configuration>

Figure 1:
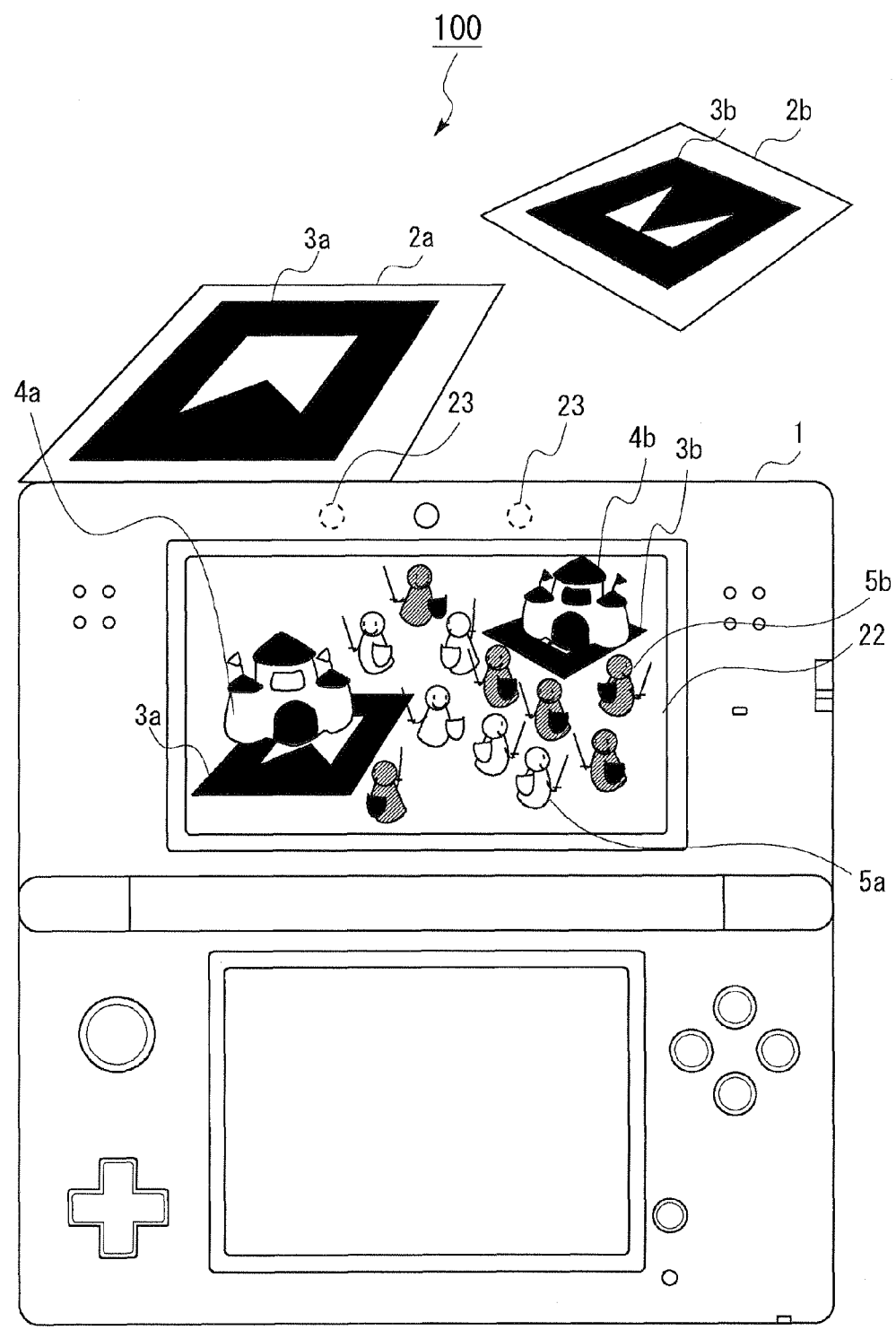
FIG. 1 shows an example non-limiting diagram illustrating a configuration of a game system according to an embodiment.

FIG. 1 is a diagram illustrating a configuration of a game system 100 according to the present embodiment. The game system 100 includes a game device 1, and a plurality of cards 2a and 2b (herein, referred to simply as the "cards 2" unless specifically distinguished from each other in terms of types of the cards). The game system 100 provides, for example, a conquering game played by a plurality of users A and B. Base positions of the respective users A and B are set by arrangement of the cards 2a and 2b, and the users A and B try to take over the opponent's base, using the space where the cards 2a and 2b are arranged as a battle field. Although the following description of the present embodiment will be made in terms of a case in which this disclosure is applied to the game system 100, the scope of application of this disclosure is not limited to games.

The game device 1 has a display 22 (to be described later as upper LCD 22) and a real camera 23 (to be described later as outside imaging unit 23). The game device 1 has a function to combine a virtual object in a virtual space rendered with a virtual camera with a captured image of a real space captured by the real camera 23, and to display the composite image on the display 22. In the present embodiment, the virtual object is three-dimensional image data indicating a game character, a base, an item, a background or the like. The virtual object may be a two-dimensional image data.

In the game system 100, when an image of the card 2 is captured with the real camera 23 of the game device 1, virtual objects which are not present in the imaged real space but located in the virtual space of game device 1 are displayed on the display (see FIG. 1). In the example shown in FIG. 1, the displayed virtual objects include a base object 4a of the user A and a character object 5a of the user A, and a base object 4b of the user B and a character object 5b of the user B. When the users manipulate (e.g. move) the cards 2, positions and attitudes of the virtual objects displayed on the display 22 of the game device 1, and other parameters associated with the virtual objects are varied. This means that, in a game provided by the game system 100, the state of the virtual space displayed on the display 22 of the game device 1 is also changed according to variation in the state of the real space whose image is captured by the game device 1.

The cards 2a and 2b have markers 3a and 3b (herein, referred to simply as the "markers 3" unless specifically distinguished from each other in terms of types of the markers) added by printing or other methods. Each of these markers 3 is associated with a virtual object and serves as an index indicating the position and attitude of the virtual object associated with the marker 3. In the present embodiment, the game is played by the users A and B, the card 2a is arranged by the user A, and the card 2b is arranged by the user B. Although only two cards 2 are shown in FIG. 1, the number of the cards 2 may be three or more. Although the cards 2a and 2b are assigned with different markers 3a and 3b, respectively, in order to distinguish which card belongs to the user A and which card belongs to the user B, the cards 2 may be assigned with the same marker.

Each virtual object is synthetically displayed at a predetermined position with respect to the associated marker 3, in the display 22 of the game device 1. Each virtual object has vertical, front-back, and horizontal directions. Therefore, the markers 3 may be those capable of specifying the displayed attitude of the virtual objects. This means that the markers 3 may be symbols, characters, graphics, pictures, or combinations thereof, which are able to specify the positions and attitudes relative to the real camera 23 by being imaged with the real camera 23.

Figure 2:
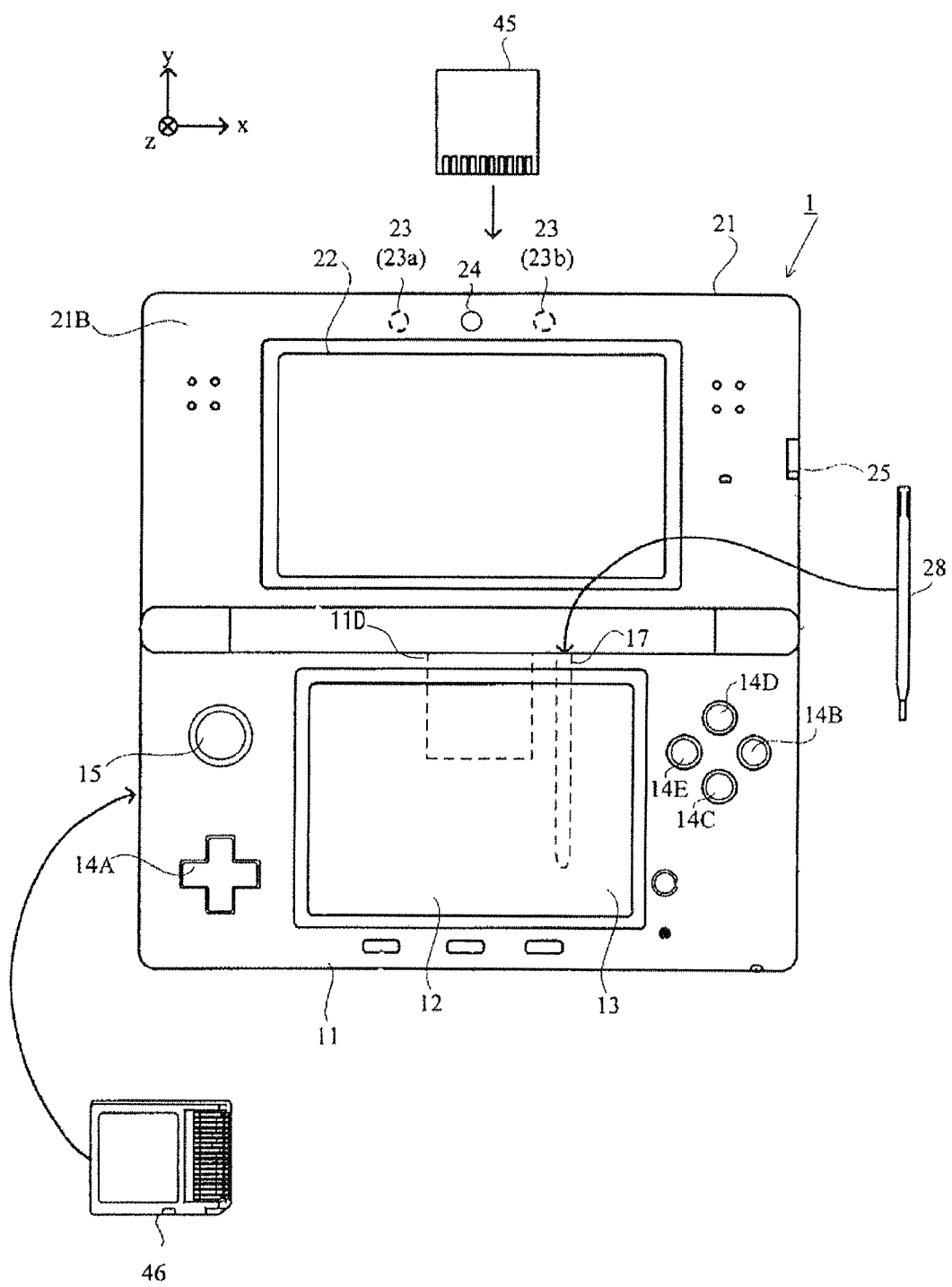
FIG. 2 shows an example non-limiting external view of the game device according to the embodiment.

FIG. 2 is an external view of the game device 1 according to the present embodiment. The game device 1 has a lower housing 11 and an upper housing 21. The lower housing 11 and the upper housing 21 are openably/closably coupled to each other (in a foldable fashion) by means of a hinge structure.

The lower housing 11 is provided with a lower LCD (Liquid Crystal Display) 12, a touch panel 13, operating buttons 14A to 14E, an analog stick 15, an insertion hole 11D, and another insertion hole 17.

The lower LCD 12 is a display device which displays an image planarly (not stereoscopically). The touch panel 13 is one of input devices the game device 1 has. A touch pen 28 used to input on the touch panel 13 is inserted into the insertion hole 17 and accommodated therein (as indicated by the broken line in FIG. 2). The user may use his/her finger in place of the touch pen 28.

The operating buttons 14A to 14E are input device for performing predetermined inputs. The buttons 14A to 14E are respectively assigned with functions according to a program to be executed by the game device 1. The four-way button 14A is used, for example, for SELECT operations or operations to move character objects in the game. The operating buttons 14B to 14E are used, for example, for decision operations or cancelling operations. The analog stick 15 is a device for indicating a direction.

The insertion hole 11D (indicated by the broken line in FIG. 2) is provided so that an external memory 45 on which a game program is recorded is inserted therein.

The upper housing 21 is provided with an upper LCD 22, an outside left imaging unit 23a, an outside right imaging unit 23b, an inside imaging unit 24, and a 3D adjustment switch 25.

The upper LCD 22 is a display device which is switchable between a stereoscopic display mode for displaying a stereoscopically viewable image and a planar display mode for planarly displaying an image (displaying a plarnarly viewable image). These display modes are switched over by means of the 3D adjustment switch 25.

The inside imaging unit 24 is an imaging unit which captures an image in an inward normal direction from an inner surface 21B of the upper housing 21. The outside left imaging unit 23a and outside right imaging unit 23b are both imaging units which capture an image in an outward normal direction from the outer surface opposite the inner surface 21B. Hereafter, the outside left imaging unit 23a and the outside right imaging unit 23b are collectively referred to as the outside imaging unit 23.

Figure 3:
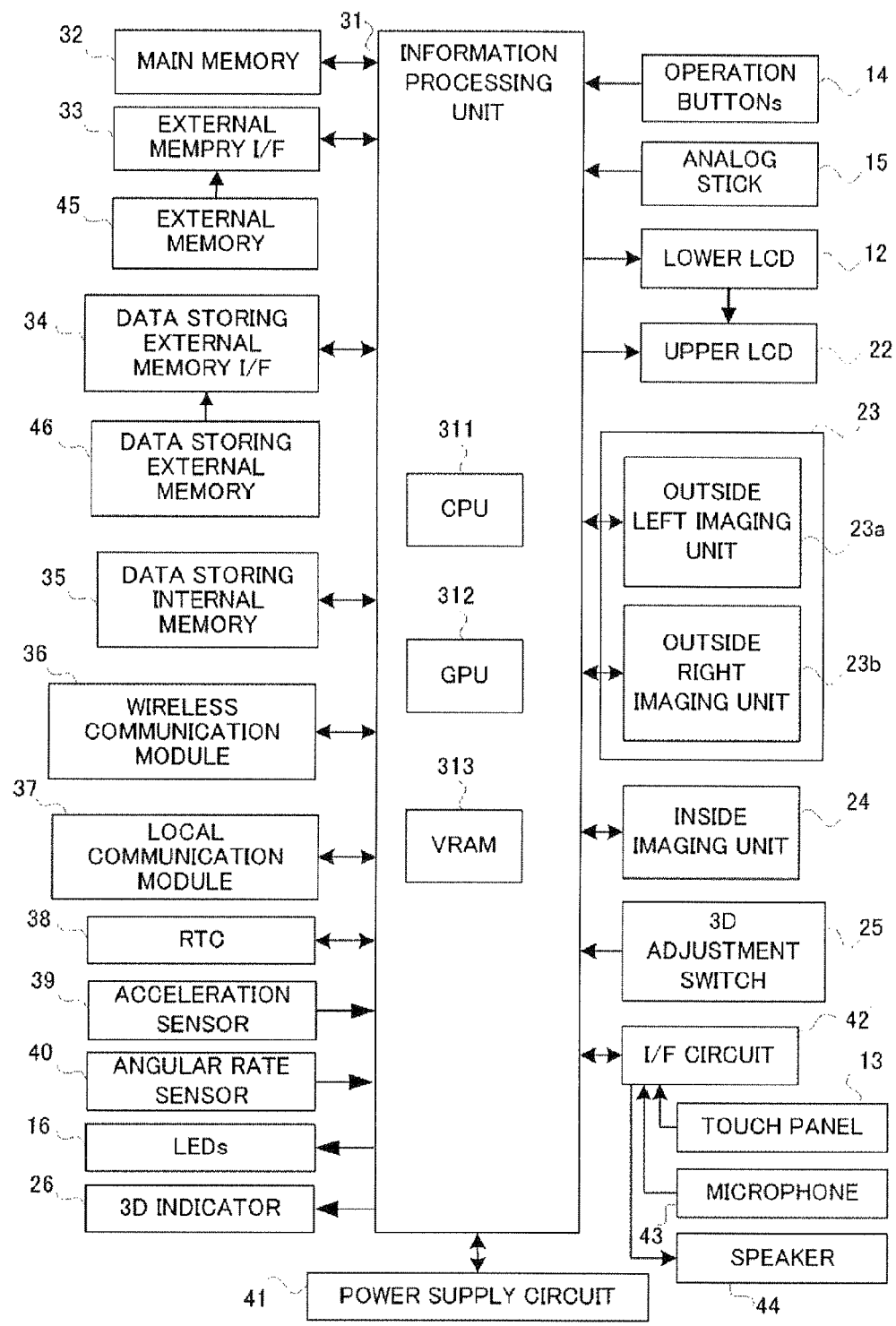
FIG. 3 shows an example non-limiting block diagram illustrating an internal configuration of the game device according to the embodiment.

FIG. 3 is a block diagram illustrating an internal configuration of the game device 1 according to the present embodiment. In addition to the components described above, the game device 1 further has electronic components including an information processing unit 31, a main memory 32, an external memory interface (external memory I/F) 33, a data storing external memory I/F 34, a data storing internal memory 35, a wireless communication module 36, a local communication module 37, a real-time clock (RTC) 38, an acceleration sensor 39, an angular rate sensor 40, a power supply circuit 41, and an interface circuit (I/F circuit) 42. These electronic components are mounted on an electronic circuit board, and accommodated in the lower housing 11 (or in the upper housing 21).

The information processing unit 31 includes a CPU (Central Processing Unit) 311 for executing a predetermined program, a GPU (Graphics Processing Unit) 312 for performing image processing, and a VRAM (Video RAM) 313. The CPU 311 performs predetermined processing by executing the predetermined program stored in a memory within the game device 1 (e.g. the external memory 45 connected to the external memory I/F 33 or the data storing internal memory 35). The program executed by the CPU 311 of the information processing unit 31 may be acquired from other equipment by way of communication therewith. The GPU 312 of the information processing unit 31 generates an image in response to a command from the CPU 311 of the information processing unit 31 and renders the image in the VRAM 313. The image rendered in the VRAM 313 is output to and displayed on the upper LCD 22 and/or the lower LCD 12.

The information processing unit 31 is connected to the main memory 32, the external memory I/F 33, the data storing external memory I/F 34, and the data storing internal memory 35. The external memory I/F 33 is an interface for removably connecting the external memory 45. The data storing external memory I/F 34 is an interface for removably connecting the data storing external memory 46.

The main memory 32 is volatile storage means used as a work area or buffer area of the information processing unit 31 (CPU 311). Specifically, the main memory 32 temporarily stores various data or a program acquired from an external source (the external memory 45 or other equipment). In the present embodiment, a PSRAM (Pseudo-SRAM), for example, is used as the main memory 32.

The external memory 45 is non-volatile storage means for storing a program to be executed by the information processing unit 31. The external memory 45 is formed, for example, of a read-only semiconductor memory. When the external memory 45 is connected to the external memory I/F 33, the information processing unit 31 is enabled to read a program stored in the external memory 45. Predetermined processing is performed by the information processing unit 31 executing the read program.

The data storing external memory 46 is non-volatile random-access memory (e.g. NAND-type flash memory), and is used for storing predetermined data. For example, the data storing external memory 46 may be an SD card. The data storing internal memory 35 is formed of a random-access non-volatile memory (e.g. NAND-type flash memory), and is used for storing predetermined data. For example, data or a program downloaded by wireless communication through the wireless communication module 36 are stored in the data storing external memory 46 and the data storing internal memory 35.

The information processing unit 31 is connected to the wireless communication module 36 and the local communication module 37. The wireless communication module 36 has a function of connecting to a wireless LAN by a method according to IEEE802.11b/g standard, for example. Using the wireless communication module 36, the information processing unit 31 is capable of exchanging data with other equipment via the Internet, and performing direct wireless communication with another game device 1 in IEEE802.11b/g ad-hoc mode. The local communication module 37 has a function of performing wireless communication with another game device of the same type by a predetermined communication method (e.g. infrared-ray communication). The information processing unit 31 is capable of exchanging data with another game device of the same type with the use of the local communication module 37.

The information processing unit 31 is connected to the acceleration sensor 39. The acceleration sensor 39 detects a magnitude of acceleration in a linear direction (linear acceleration) along three axes (x, y and z axes). The acceleration sensor 39 may be either an electrical capacitance type acceleration sensor or another type of acceleration sensor. The acceleration sensor 39 may be an acceleration sensor for detecting acceleration in a direction along a single or two axes. The information processing unit 31 receives data (acceleration data) indicating the acceleration detected by the acceleration sensor 39 and calculates an attitude or motion of the game device 1.

The information processing unit 31 is connected to the angular rate sensor 40. The angular rate sensor 40 detects an angular rate around each of the three axes of the game device 1, and outputs data indicating the detected angular rate (angular rate data) to the information processing unit 31. Upon receiving the angular rate data output from the angular rate sensor 40, the information processing unit 31 calculates an attitude or motion of the game device 1.

The information processing unit 31 is connected to the RTC 38 and the power supply circuit 41. The RTC 38 counts time and outputs the counted time to the information processing unit 31. The information processing unit 31 calculates current time of day based on the time counted by the RTC 38. The power supply circuit 41 controls power supplied from a power supply possessed by the game device 1 (rechargeable battery accommodated in the lower housing 11), and supplies the power to the components of the game device 1.

The information processing unit 31 is connected to the I/F circuit 42. The I/F circuit 42 is connected to a microphone 43, a speaker 44, and a touch panel 13. The microphone 43 detects the user's voice and outputs an audio signal to the I/F circuit 42. The speaker 44 amplifies the audio signal from the I/F circuit 42 by means of an amplifier (not shown) and outputs sound. The I/F circuit 42 includes a audio control circuit for controlling the microphone 43 and the speaker 44, and a touch panel control circuit for controlling the touch panel 13. The audio control circuit performs A/D conversion and D/A conversion of the audio signal, or converts the audio signal into voice data of a predetermined type. In the present embodiment, a resistive film type touch panel is used as the touch panel 13. However, the touch panel 13 is not limited to the resistive film type. The touch panel 13 may be any pressing-type touch panel, such as a capacitance-type touch panel. The touch panel control circuit generates a touch position coordinate on the touch panel 13 of a predetermined type based on the signal from the touch panel 13 and outputs the generated touch position coordinate to the information processing unit 31. The information processing unit 31 is enabled, by acquiring the touch position data, to detect the touch position where a touch input has been performed on the touch panel 13.

The operating buttons 14 and the analog stick 15 are connected to the information processing unit 31, and output operating data indicating inputs to the operating buttons 14A to 14E and analog stick 15 to the information processing unit 31. Upon acquiring the operating data from the operating buttons 14 and the analog stick 15, the information processing unit 31 performs processing according to the inputs to the operating button 14 and the analog stick 15.

The lower LCD 12 and the upper LCD 22 are connected to the information processing unit 31. The lower LCD 12 and the upper LCD 22 display an image according to instructions of the information processing unit 31 (GPU 312). The lower LCD 12 is a display device for displaying an image in a planar manner (not in a stereoscopically viewable manner). The number of pixels possessed by the lower LCD 12 is, for example, 320 dots×240 dots (W×H). Although a LCD is used as the display device in the present embodiment, other display devices such as a display device using EL (Electro Luminescence) may be used. A display device having a desired resolution can be used as the lower LCD 12.

The upper LCD 22 is a display device capable of displaying an image which is stereoscopically viewable with the naked eyes. The upper LCD 22 used here is of a lenticular type or parallax barrier type so that a left-eye image and a right-eye image which are displayed alternately in a horizontal direction can be viewed separately and respectively by the user's left eye and right eye. The number of pixels possessed by the upper LCD 22 is, for example, 800 dots×240 dots (W×H). In the present embodiment, the upper LCD 22 is described as a liquid-crystal display device. However, the upper LCD 22 is not limited to this, but may be a display device using, for example, EL or the like. Further, a display device having any resolution can be used as the upper LCD 22.

The outside imaging unit 23 and the inside imaging unit 24 are connected to the information processing unit 31. Each of the outside imaging unit 23 and the inside imaging unit 24 captures an image according to instructions of the information processing unit 31, and outputs the captured image data to the information processing unit 31.

The inside imaging unit 24 includes a lens and an imaging element having a predetermined resolution. The imaging element may be, for example, a CCD image sensor or a CMOS image sensor. The lens may have a zooming mechanism.

Each of the outside left imaging unit 23a and the outside right imaging unit 23b includes a lens and an imaging element (e.g. a CCD image sensor or a CMOS image sensor). The imaging elements of the imaging units 23a and 23b have a predetermined common resolution. The lens may have a zooming mechanism. Depending on a program to be executed by the game device 1, either one of the outside image units (outside left imaging unit 23a and the outside right imaging unit 23b) can be used alone. The following description of the present embodiment will be made in terms of a case in which only one of the outside imaging units is used.

The 3D adjustment switch 25 is connected to the information processing unit 31. The 3D adjustment switch 25 transmits an electric signal according to a slider position to the information processing unit 31.

Figure 4:
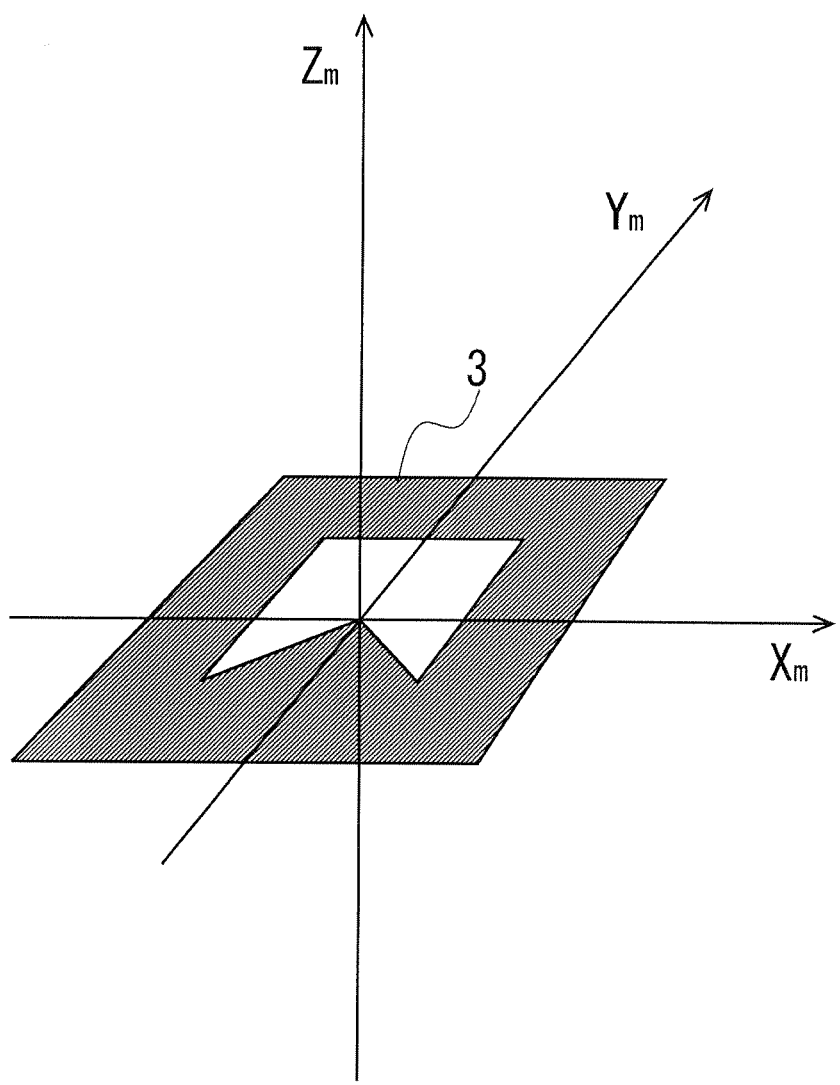
FIG. 4 shows an example non-limiting diagram illustrating a coordinate system used by the game system according to the embodiment.

FIG. 4 is a diagram illustrating a marker coordinate system (Xm, Ym, Zm) used by the game system 100 according to the present embodiment. The marker coordinate system is a coordinate system having its origin at the center point of the marker 3 and defined by three axes perpendicular to one another. The X-axis and Y-axis of the marker coordinate system are defined on the plane on which the marker 3 lies, while the Z axis is defined in a perpendicular direction (vertical direction) to the plane. The marker 3 has the front, back, left, and right sides defined. For example, the X-axis is defined in the left-right direction, while the Y-axis is defined in the front-back directions. In this manner, a coordinate system of the virtual space is defined using the marker 3 arranged in the real space as the reference, whereby the real space and the virtual space can be associated with each other.

The marker coordinate system is defined for each of the markers 3. However, it is also possible that a plurality of markers 3 use a single marker coordinate system in common. The origin of the marker coordinate system need not necessarily be the center point of the marker 3. For example, a certain feature point in the marker 3 can be used as the origin of the marker coordinate system. The method of defining the X-axis, Y-axis and Z-axis described in the present embodiment is illustrative only, and the X-axis, the Y-axis and the Z-axis may be defined based on any other reference.

The game device 1 is able to detect the marker 3 contained in an image captured by the outside left imaging unit 23a or the outside right imaging unit 23b (hereafter, referred to simply as the "outside imaging unit 23") by performing image processing such as pattern matching on the captured image. Based on the detected marker 3, the game device 1 calculates a relative position and attitude between the marker 3 and the outside imaging unit 23.

In the present embodiment, a virtual object to be arranged in the virtual space is arranged in the marker coordinate system of the marker 3 associated with the virtual object. The virtual object is rendered by being imaged with a virtual camera arranged in the virtual space, and displayed on the display 22 of the game device 1. The virtual camera used herein is for capturing an image of the virtual space to be viewed by the user. The position and attitude of the virtual camera in the marker coordinate system are made coincident with the position and attitude of the outside imaging unit 23 in the real space. Therefore, the virtual space is defined based on the marker 3, and an image in the virtual space displayed on the upper LCD 22 can be changed by changing the position or imaging direction of the outside imaging unit 23 in the virtual space.

Figure 5:
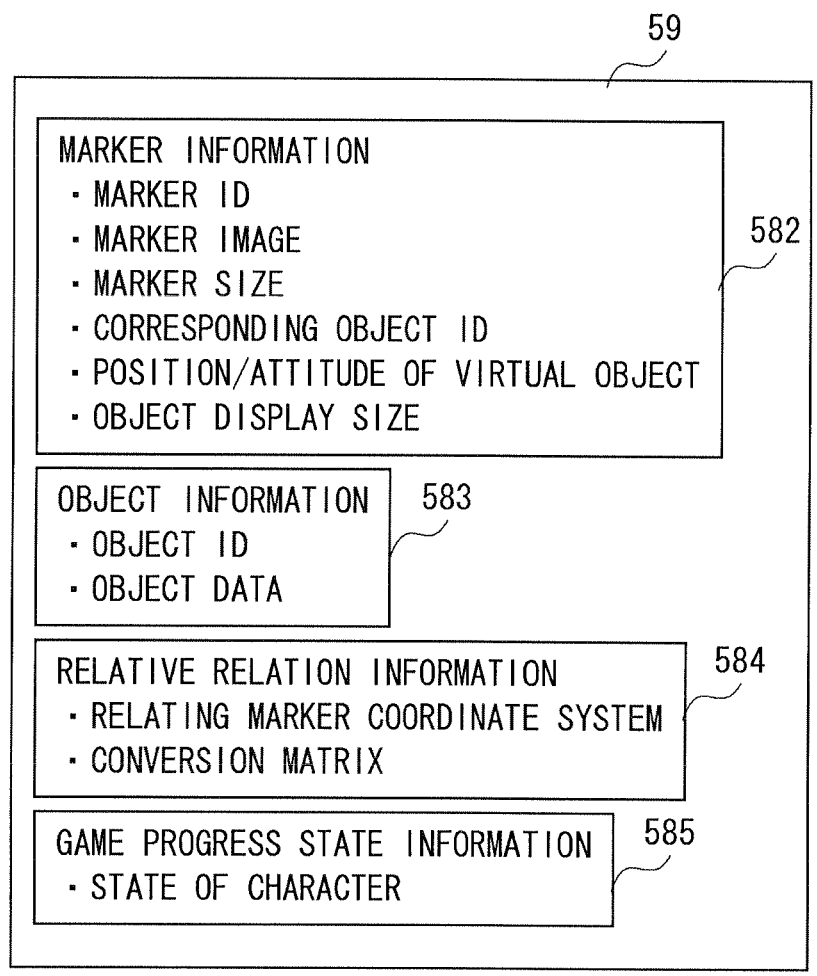
FIG. 5 shows an example non-limiting diagram illustrating information held by the game device according to the embodiment.

FIG. 5 is a diagram illustrating information held by the game device 1 according to the present embodiment. The game device 1 holds marker information 582, object information 583, relative relation information 584, and game progress status information 585. These items of information are held in a storage unit 59 to be described later.

The marker information 582 is information relating to the marker 3. The marker information includes, for example, a marker ID for identifying the marker 3, a marker image, a marker size, a corresponding object ID, position/attitude of the virtual object, an object display size, and so on. The marker image is an image showing an external appearance of the marker 3. The marker size is information indicating a size of the marker 3 such as horizontal and vertical lengths of the marker 3. Based on the marker image and the marker size, or based on the appearance of the marker 3 contained in the captured image, the game device 1 is able to acquire a distance between the imaging unit and the marker 3 and the attitude of the marker 3, that is, marker position/attitude information and a marker coordinate system. The corresponding object ID is an identification number of the virtual object displayed at a position corresponding to the marker 3. Two or more virtual objects may be associated with a single marker 3. In the present embodiment, the marker information 582 includes object IDs of a base object and a character object managed by the marker coordinate system. The position/attitude of the virtual object is represented by a position (coordinate values) and an attitude (unit vector) in the marker coordinate system. The marker information 582 is set for each of the markers 3 used in the game system 100.

The object information 583 is information relating to a virtual object displayed at a position corresponding to the marker 3. The object information 583 includes, for example, an object ID for identifying the virtual object and object data. The object information 583 is set for each of the objects used in the game system 100.

The relative relation information 584 is information indicating a relative relation in position and attitude among marker coordinate systems. Specifically, in the present embodiment, the relative relation information 584 is constituted by a conversion matrix for performing coordinate conversion between different marker coordinate systems, and the conversion matrix is stored in association with a plurality of associated marker coordinate systems.

The game progress status information 585 is information containing a game progress status. The game progress status information 585 contains, for example, a status of a character in the game.

Figure 6:
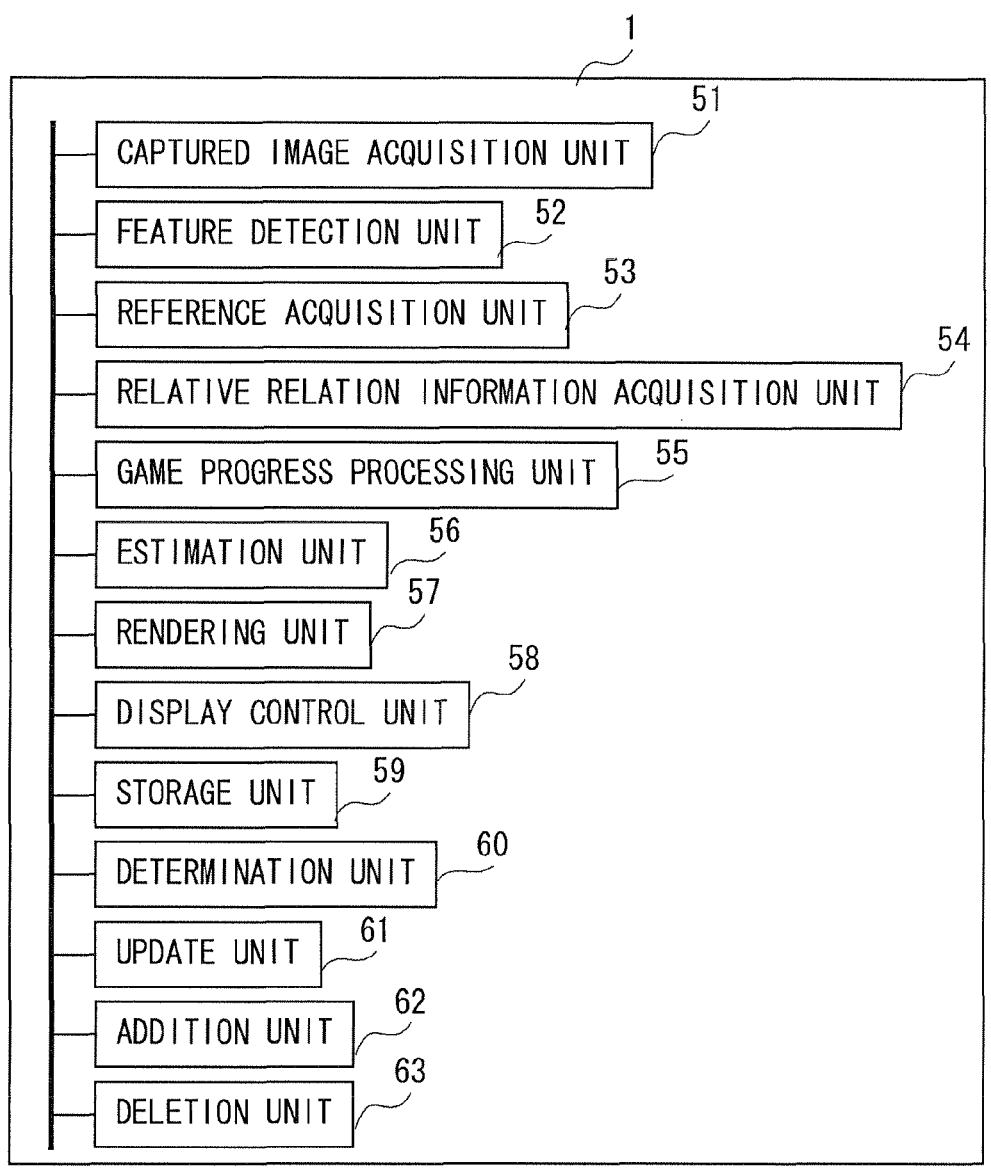
FIG. 6 shows an example non-limiting functional block diagram of the game device according to the embodiment.

FIG. 6 is a functional block diagram of the game device 1 according to the present embodiment. The functional blocks shown in FIG. 6 are a part of the functions realized by the information processing unit 31 (CPU 311 and GPU 312) reading and executing a game program stored in the external memory 45.

By executing a game program, the game device 1 is caused to operate as a captured image acquisition unit 51, a feature detection unit 52, a reference acquisition unit 53, a relative relation information acquisition unit 54, a game progress processing unit 55, an estimation unit 56, a rendering unit 57, a display control unit 58, a storage unit 59, a determination unit 60, an update unit 61, an addition unit 62, and a deletion unit 63.

The captured image acquisition unit 51 acquires an image captured by the outside imaging unit 23. More specifically, the captured image acquisition unit 51 instructs the outside imaging unit 23 to capture an image, and acquires the image captured by the outside imaging unit 23. The captured image acquisition unit 51 indicates to the outside imaging unit 23 predetermined intervals at which images are to be captured. The captured image acquisition unit 51 acquires captured images at the predetermined intervals. Game processing according to the present embodiment is executed as a part of game processing which is performed in units of frames divided by 60 frames per second. Thus, the predetermined interval is, for example, 1/60 seconds.

The feature detection unit 52 detects, from the captured image, a marker 3 corresponding to the marker image contained in the marker information 582. This detection of the marker 3 is performed with the use of an image recognition engine, for example.

Based on the detected marker 3, the reference acquisition unit 53 acquires a position/attitude reference which serves as the reference for indicating position and attitude in the space which has been imaged in the captured image. The term "position/attitude reference" as used herein means a reference used for indicating a position and attitude of a real object (e.g. the marker 3) in the real space or of a virtual object in the virtual space. In the reference acquisition processing according to the present embodiment, a marker coordinate system having its origin at the center point of the marker 3 and using three axes perpendicular to one another is acquired as the position/attitude reference for each of the markers 3. The reference acquisition unit 53 retrieves, from the storage unit 59, the marker information 582 corresponding to the detected marker 3 to find position/attitude information of the marker 3 in the real space, and acquires a marker coordinate system based on this result. The position/attitude information and marker coordinate system of the marker 3 can be acquired, for example, by using a dedicated software library such as AR Tool Kit. A camera coordinate system also can be used as the reference for representing the position/attitude in the real space. This means that the position/attitude information of the marker 3 can be position/attitude information using the camera coordinate system as the reference. The camera coordinate system may be a coordinate system having the origin at the focal position of the outside imaging unit 23, the Z-axis of which is defined in an imaging direction of the outside imaging unit 23, and the X-axis and Y-axis of which are defined on the plane perpendicular to the imaging direction.

The relative relation information acquisition unit 54 acquires, based on a captured image for which a plurality of markers 3 have been detected, relative relation information indicating a relative relation in position and attitude among a plurality of marker coordinate systems acquired for the respective markers 3. The acquired relative relation information is stored in the storage unit 59. In the present embodiment, the relative relation information is a conversion matrix used for performing coordinate conversion between different marker coordinate systems.

The game progress processing unit 55 manages the progress of a game according to the present embodiment by referring to and updating the game progress status information 585. In the present embodiment, the game progress processing unit 55 performs predetermined processing so that time in the virtual space advances along with the passage of real time.

The estimation unit 56 estimates one of the plurality of marker coordinate systems the relative relation of which has been obtained in the relative relation information (conversion matrix for coordinate conversion), based on the other one of the plurality of marker coordinate systems and the relative relation information.

The rendering unit 57 renders a virtual space image by arranging a virtual camera in the virtual space, arranging, in the virtual space, a virtual object whose position and attitude are determined according to the marker coordinate system, and generating an image of the virtual space as viewed from the virtual camera.

The display control unit 58 generates a composite image in which the captured image is combined with the virtual space, and causes the display device to display the composite image.

The storage unit 59 stores the marker information 582, the object information 583, the relative relation information 584, and the game progress status information 585 described with reference to FIG. 5.

The determination unit 60 determines whether or not the relative relation information acquired by the relative relation information acquisition unit 54 is one corresponding to the relative relation information stored in the storage unit 59. According to a result of the determination by the determination unit 60, either processing to update the relative relation information by the update unit 61 or processing to add relative relation information by the addition unit 62 is performed.

The update unit 61 updates the stored relative relation information based on the acquired relative relation information, when the determination unit 60 determines that the acquired relative relation information is the one corresponding to the stored relative relation information.

The addition unit 62 causes the storage unit 59 to store the acquired relative relation information, when the determination unit 60 does not determine that the acquired relative relation information is the one corresponding to the relative relation information.

The deletion unit 63 deletes relative relation information satisfying predetermined conditions from the storage unit 59. In the present embodiment, the relative relation information which has been acquired in the preceding frame is referred to, and if no relative relation information corresponding to this relative relation information has been acquired in the current frame and although a position at which a marker 3 should be present according to the relative relation information is contained in the captured image, no marker 3 has been detected at this position, it is then determined that a card 2 related to the marker 3 has been removed, and the relative relation information is deleted from the storage unit 59. However, the predetermined conditions for deletion by the deletion unit 63 may be other conditions. For example, the deletion may be performed on the condition that predetermined conditions in progress of the game have been satisfied by the game progress processing unit 55.

<Flow of Processing>

A flow of processing performed in the present embodiment will be described. It should be understood that specific details and a sequence of processing steps shown in the flowcharts according to the present embodiment are given for illustrative purposes only for execution of a program according to this disclosure. The specific details and the sequence of processing steps may be selected as appropriate, according to an embodiment of the program or the like according to this disclosure.

Figure 7:
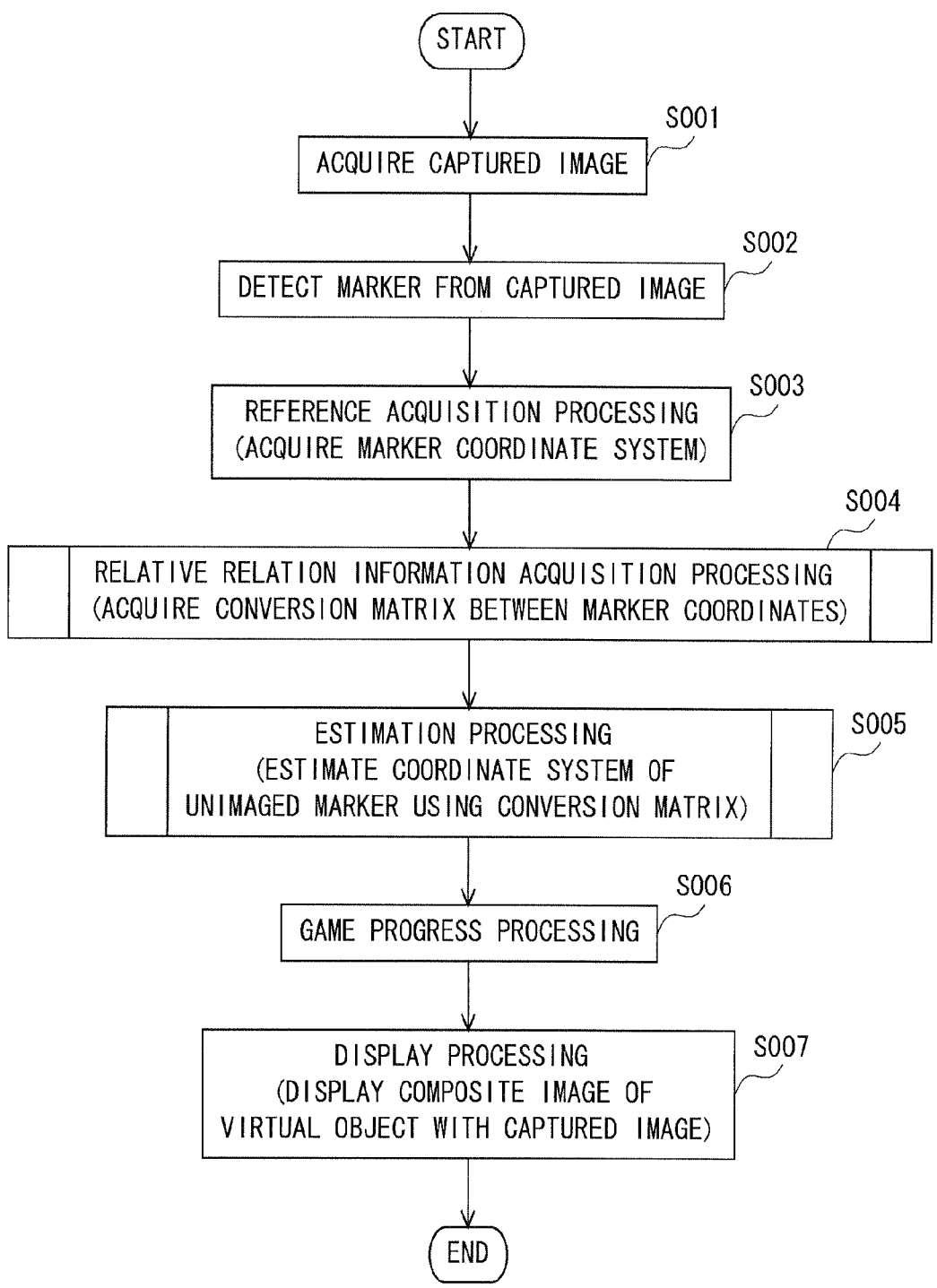
FIG. 7 shows an example non-limiting flowchart illustrating a flow of game processing according to the embodiment.

FIG. 7 is a flowchart illustrating a flow of game processing according to the present embodiment. The game processing according to the present embodiment is performed as a part of game processing which is performed in units of frames divided by 60 frames per second, and is performed frame by frame.

In step S001 and step S002, a captured image is acquired, and a marker 3 is detected from the captured image. The captured image acquisition unit 51 acquires an image captured by the outside imaging unit 23 (step S001). Once the captured image is acquired, the feature detection unit 52 detects, from the captured image, a marker 3 corresponding to a marker image contained in the marker information 582 (step S002). The marker 3 can be detected by using a commonly-used image recognition engine, although the marker 3 is usually imaged in a distorted state in the captured image, unless the marker 3 is positioned right in front of the outside imaging unit 23 (for example, positioned perpendicularly to the Z-axis of the camera coordinate system). The processing then proceeds to step S003.

In step S003, reference acquisition processing is performed for each marker 3. The reference acquisition unit 53 acquires, for each of the markers 3 detected in step S002, the position and attitude of the marker 3 in the real space (hereafter, referred to as the "marker position/attitude information"), and acquires a position/attitude reference using the marker 3 as the reference (marker coordinate system).

The reference acquisition unit 53 finds marker position/attitude information in the real space of the marker 3 detected from the captured image. More specifically, the reference acquisition unit 53 acquires the position of the marker 3 in the real space by comparing the marker size contained in the marker information 582 with the size of the marker 3 contained in the captured image. As mentioned in the above, the marker 3 is imaged in a distorted state in the captured image unless the marker 3 is positioned right in front of the outside imaging unit 23. The reference acquisition unit 53 acquires the attitude of the marker 3 in the real space by finding a distortion of the marker 3 imaged in the captured image with respect to the marker image contained in the marker information 582. In this manner, the marker position/attitude information in the real space can be obtained, and a marker coordinate system can be defined according to the marker position/attitude information. In the present embodiment, the marker coordinate system is acquired such that its origin corresponds to the center point of the marker 3. The processing then proceeds to step S004.

Figure 8:
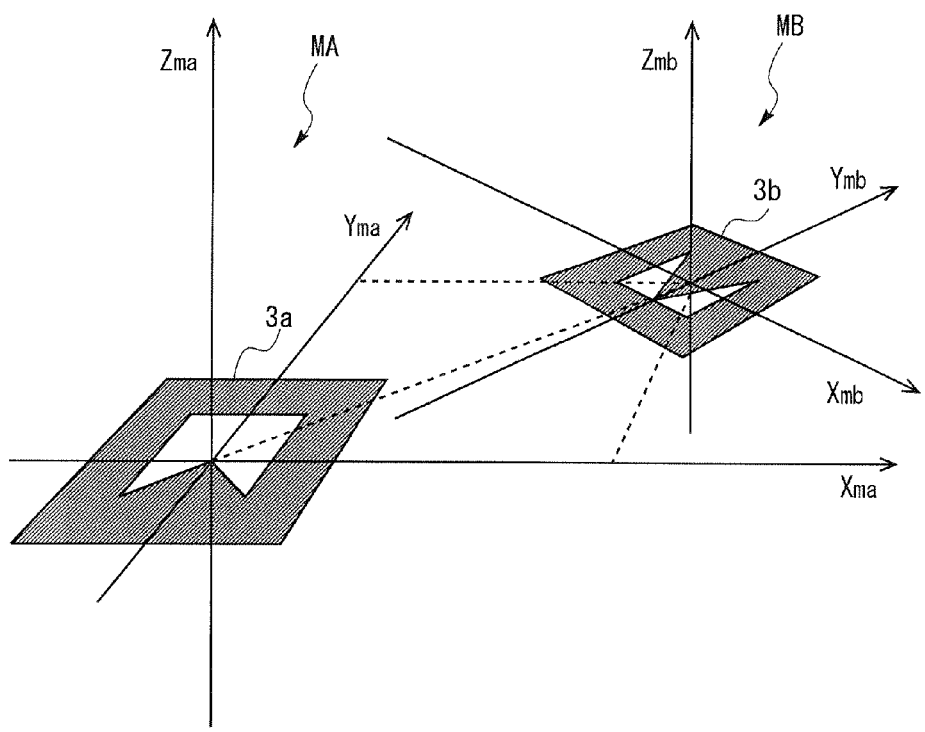
FIG. 8 shows an example non-limiting diagram illustrating a relation between marker coordinate systems according to the embodiment.

FIG. 8 is a diagram illustrating a relation between a marker coordinate system MA and a marker coordinate system MB in the present embodiment. The marker coordinate system MA is a coordinate system $(X_{ma}, Y_{ma}, Z_{ma})$ which has its origin at the center point of a marker 3a attached to a card 2a, and is defined by the Z-axis perpendicular to a plane where the marker 3a lies, and by the X-axis and Y-axis defined in this plane. The marker coordinate system MB is a coordinate system ($X_{mb}$, $Y_{mb}$, $Z_{mb}$) which has its origin at the center point of a marker 3b applied to a cards 2b, and is defined by the Z-axis perpendicular to a plane where the marker 3b lies, and by the X-axis and Y-axis defined in this plane.

In step S004, relative relation acquisition processing is performed. When a plurality of markers 3 are imaged in a single captured image, relative relation information indicating a relative relation in position and attitude (a conversion matrix for coordinate conversion) between marker coordinate systems related to the respective markers 3 is acquired in the relative relation acquisition processing. The relative relation information acquisition unit 54 acquires the relative relation information for each combination of the detected markers 3 (each combination of the acquired marker coordinate systems).

In the example shown in FIG. 8, the relative relation information acquisition unit 54 acquires the relative relation information by calculating a conversion matrix for performing coordinate conversion from the marker coordinate system MA ($X_{ma}$, $Y_{ma}$, $Z_{ma}$) to the marker coordinate system MB ($X_{mb}$, $Y_{mb}$, $Z_{mb}$), and a conversion matrix for performing coordinate conversion from the marker coordinate system MB ($X_{mb}$, $Y_{mb}$, $Z_{mb}$) to the marker coordinate system MA ($X_{ma}$, $Y_{ma}$, $Z_{ma}$). Details of the relative relation acquisition processing will be described later with reference to FIG. 9. The processing then proceeds to step S005.

In step S005, estimation processing is performed. The estimation unit 56 estimates a marker coordinate system related to a marker 3 not contained in the captured image (that is, a marker 3 which is outside of the imaging range of the outside imaging unit 23), based on the marker coordinate system related to a marker 3 contained in the captured image and the relative relation information. Details of the estimation processing will be described later with reference to FIG. 10. The processing then proceeds to step S006.

In the example shown in FIG. 8, when the marker 3b is not imaged, the estimation unit 56 estimates the marker coordinate system MB related to the marker 3b, based on the marker coordinate system MA related to the marker 3a contained in the captured image and the relative relation information between the marker coordinate system MA and the marker coordinate system MB.

In step S006, game progress processing is performed. As described in the above, the game according to the present embodiment is a conquering game played by a plurality of users. Positions of base objects of the respective users are set by arrangement of the cards 2a and 2b, and the game is caused to progress while using the space in which the cards 2a and 2b are arranged as the field.

In the game according to the present embodiment, as described in the above, virtual objects including the base object 4a of the user A, the character object 5a of the user A, the base object 4b of the user B, the character object 5b of the user B and so on are rendered by the virtual camera the position of which is adjusted with the outside imaging unit 23, and displayed in combination with the captured image. The virtual objects related to the user A are managed by the marker coordinate system MA related to the card 2a arranged by the user A. The virtual objects related to the user B are managed by the marker coordinate system MB related to the card 2b arranged by the user B. The virtual objects related to the user A include, for example, the base object 4a and the character object 5a. The virtual objects related to the user B include, for example the base object 4b and the character object 5b.

The game progress processing unit 55 manages the progress of the game by referring to the game progress status information 585 in the storage unit 59 relating to the game according to the present embodiment. As described above, the marker information 582 includes positions and attitudes of the virtual objects in the marker coordinate systems MA and MB, and the game progress processing unit 55 updates these positions and attitudes according to the progress of the game. The processing then proceeds to step S007.

In the game progress processing, the relation in position and attitude among the objects can be managed by a method employing a common coordinate system for managing all the objects. This common coordinate system may be defined by designating one of the marker coordinate systems, or by designating a coordinate system different from any of the marker coordinate systems. When a coordinate system different from any the marker coordinate systems is designated as the common coordinate system, the origin and the attitudes of the three axes can be defined as required. For example, the center of gravity of the origins of all the marker coordinate systems (the center points of the markers 3 in the present embodiment) can be used as the origin of the common coordinate system. By managing the relation in position and attitude among the objects with the use of such a common coordinate system, it is made possible to determine a collision between the objects in the game. The object management with the common coordinate system may be employed in addition to the individual object management with the marker coordinate systems MA and MB, or may be employed as an alternative thereto.

In the present embodiment, the game progress processing unit 55 advances the time in the game according to the flow of real time. However, instead of advancing the time in the game according to the flow of real time, the game progress processing unit 55 may advance the time in the game by being triggered by the user's operation or a certain event occurring in the game.

In step S007, display processing is performed. The rendering unit 57 renders a virtual object arranged in a marker coordinate system from the viewpoint of a virtual camera arranged at the same position as the outside imaging unit 23 or the real camera 23 in the marker coordinate system. The display control unit 58 combines the rendered image of the virtual object with the captured image and outputs the composite image to the upper LCD 22 to be displayed thereby. In the present embodiment, the rendering of a virtual object is performed for each of the marker coordinate systems where virtual objects are arranged. However, the virtual objects may be arranged in the aforementioned common coordinate system so that they are rendered at the same time. Once the display processing is performed, the processing shown in this flowchart is terminated.

As mentioned in the above, the processing shown in the flowchart is performed for each frame. Therefore, the processing shown in the flowchart is performed repeatedly and periodically from step S001 during the progress of the game.

According to the present embodiment, a marker coordinate system related to a marker 3 not contained in the captured image (being present outside of the imaging range of the outside imaging unit 23) is also estimated by the aforementioned estimation processing. Therefore, even if a virtual object is arranged in a marker coordinate system related to a marker 3 not contained in the captured image, the virtual object will be rendered and displayed as long as it is within the imaging range of the virtual camera.

Figure 9:
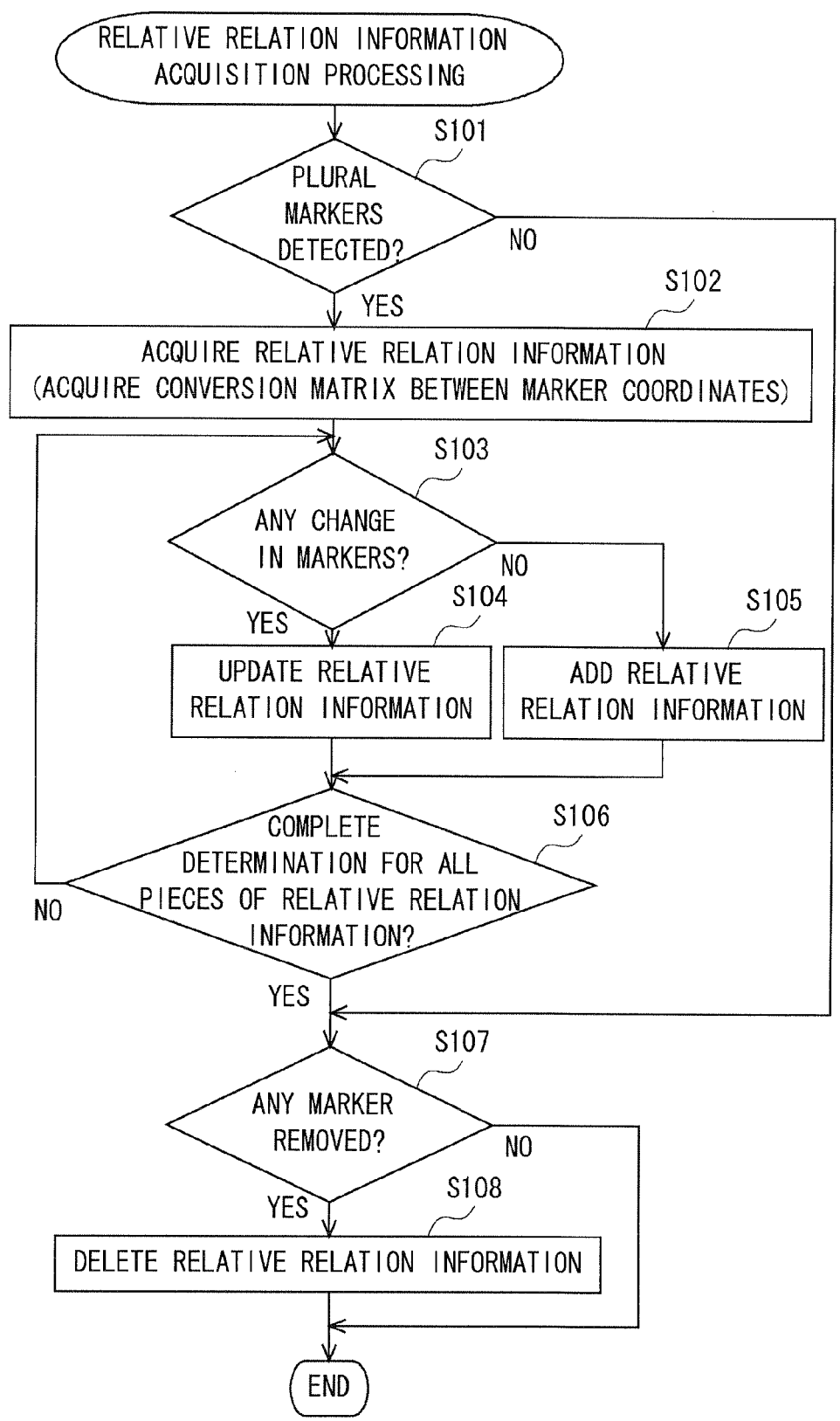
FIG. 9 shows an example non-limiting flowchart illustrating a flow of relative relation acquisition processing according to the embodiment.
Figure 10:
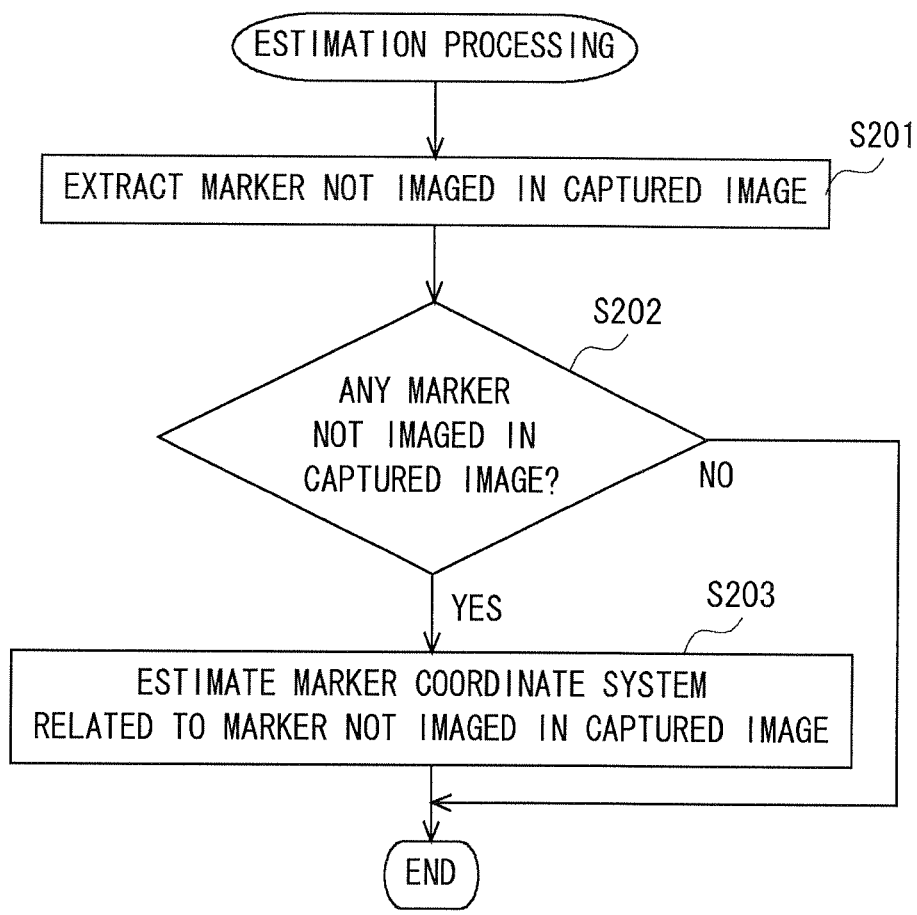
FIG. 10 shows an example non-limiting flowchart illustrating estimation processing according to the embodiment.

Referring to FIG. 9 and FIG. 10, flows of the relative relation acquisition processing and the estimation processing will be described in more detail.

FIG. 9 is a flowchart showing a flow of the relative relation acquisition processing according to the present embodiment. This flowchart illustrates the details of the relative relation acquisition processing shown in step S004 of FIG. 7.

In step S101, it is determined whether or not a plurality of markers 3 are detected. When a plurality of markers 3 are detected from the captured image in step S002, and a plurality of position/attitude references related to these markers 3 are acquired in step S003, the processing proceeds to step S102. If not more than one marker 3 is detected, the processing proceeds to step S107.

In step S102, relative relation information is acquired. The relative relation information acquisition unit 54 acquires relative relation information indicating a relative relation between marker coordinate systems related to the plurality of markers 3. In the present embodiment, as described above, the relative relation information is a conversion matrix used for performing coordinate conversion between different marker coordinate systems.

When the marker 3a and the marker 3b are contained in a single captured image, the position of the origin of the marker coordinate system MB in the marker coordinate system MA can be calculated and, further, the attitudes of the axes constituting the marker coordinate system MB in the marker coordinate system MA can be calculated. It is made possible, by calculating these items of information, to acquire a conversion matrix $T_{AB}$ for performing coordinate conversion from the marker coordinate system MA to the marker coordinate system MB.

More specifically, the relative relation information acquisition unit 54 monitors unit vectors of the marker coordinate system MA (see the formula (1) below) in the marker coordinate system MB. The formula (2) represents vectors obtained as a result of monitoring the unit vectors of the marker coordinate system MA in the marker coordinate system MB. In this case, the conversion matrix $T_{AB}$ for converting the marker coordinate system MA to the marker coordinate system MB is represented by the formula (3) below. Accordingly, the relative relation information acquisition unit 54 acquires the conversion matrix $T_{AB}$ represented by the formula 3 as the relative relation information for performing coordinate conversion from the marker coordinate system MA to the marker coordinate system MB.

[Expression 1]

$$a = \begin{pmatrix} 1 \\ 0 \\ 0 \end{pmatrix}, b = \begin{pmatrix} 0 \\ 1 \\ 0 \end{pmatrix}, c = \begin{pmatrix} 0 \\ 0 \\ 1 \end{pmatrix} \quad \text{formula 1}$$

$$u = \begin{pmatrix} u1 \\ v1 \\ w1 \end{pmatrix}, v = \begin{pmatrix} u2 \\ v2 \\ w2 \end{pmatrix}, v = \begin{pmatrix} u3 \\ v3 \\ w3 \end{pmatrix} \quad \text{formula 2}$$

$$T_{AB} = \begin{pmatrix} u1 & u2 & u3 \\ v1 & v2 & v3 \\ w1 & w2 & w3 \end{pmatrix} \quad \text{formula 3}$$

This conversion matrix is a conversion matrix $T_{AB}$ for performing coordinate conversion from the marker coordinate system MA to the marker coordinate system MB. A conversion matrix $T_{BA}$ for performing coordinate conversion from the marker coordinate system MB to the marker coordinate system MA can also be acquired by the same method. However, the conversion matrix $T_{BA}$ may be acquired by calculating an inverse matrix of the conversion matrix $T_{AB}$. Once the relative relation information is acquired, the processing proceeds to step S103.

In step S103, it is determined whether or not any change has been made to the position or attitude of the marker 3 in the real space. The change in position or attitude of the marker 3 in the real space specifically includes addition and movement (including rotation) of the marker 3. In the present embodiment, the determination unit 60 determines if addition or movement of the marker 3 has been made with a determination method using the relative relation information.

The determination unit 60 compares the relative relation information acquired in step S102 with the relative relation information relating to the same combination of markers, stored in the storage unit 59. In this manner, the determination unit 60 can determine whether or not the relative relation information acquired in step S102 has been acquired before, and can determine any change in position or attitude of the marker 3. More specifically, the determination unit 60 calculates a difference between the acquired relative relation information and the relative relation information stored in the storage unit 59, and compares the calculated difference with a preset threshold. If the difference is less than the threshold, the determination unit 60 determines that the acquired relative relation information is the one held in the storage unit 59. Therefore, the threshold can be set to a value that is able to allow an error associated with the calculation of the marker coordinate system or relative relation information, and slight variation in position or attitude of the marker. In contrast, if the difference is equal to or greater than the threshold, the determination unit 60 determines that the acquired relative relation information is not the one held in the storage unit 59 (that the marker 3 has been moved from the previous position, or it is a newly added marker 3). However, the determination method is not limited to the method using the difference and the threshold, and other methods may be employed.

When it is determined that the acquired relative relation information is the one held in the storage unit 59, the processing proceeds to step S104. When it is determined that the acquired relative relation information is not the one held, in the storage unit 59, the processing proceeds to step S105.

In step S104, the relative relation information is updated. The update unit 61 updates the relative relation information relating to the same combination of markers among those pieces of relative relation information which have been acquired in step S102 and held in storage unit 59. Further, the update unit 61 updates the marker coordinate system corresponding thereto, among the marker coordinate systems which have been acquired in step S003 and held in the storage unit 59. In the present embodiment, the relative relation acquisition processing is performed in units of frames divided by 60 frames per second, and therefore the marker coordinate system and the relative relation information are updated at intervals of 1/60 seconds. Accordingly, the movement of the marker 3 at a normal rate within the imaging range of the outside imaging unit 23 can be followed basically by updating the marker coordinate system and the relative relation information. The processing then proceeds to step S106.

In the processing in step S104, an update flag is used to identify a marker related to the update of relative relation information or the update of marker coordinate system as preparation for extraction processing in step S201 to be described later. The information processing unit 31 prepares an update flag for each of the marker coordinate systems held in the storage unit 59. When relative relation information relating to a marker coordinate system is updated or a marker coordinate system is updated, the information processing unit 31 determines that the relevant marker has been captured in the captured image, and sets the relevant update flag to be "TRUE". All of the update flags are reset (set to be "FALSE") for each frame prior to the processing shown in step S104. This makes it possible to determine that none of the markers related to marker coordinate systems whose update flags are set to be "FALSE" at the time when all the processing steps of step S103 to step S106 have been completed for all the pieces of relative relation information has been captured in the captured image.

In step S105, relative relation information is added. The addition unit 62 causes the storage unit 59 to hold the relative relation information acquired in step S102. The addition unit 62 also causes the storage unit 59 to hold a marker coordinate system among the marker coordinate systems related to this relative relation information, that is not held by the storage unit 59. This means that, according to the present embodiment, any addition of a marker 3 can be detected based on the relative relation information, and the relative relation information and marker coordinate system related to this marker 3 can be added. In this case, the update flag for the added marker coordinate system is set to be "TRUE". The processing then proceeds to step S106.

In step S106, it is determined whether or not determination of change in position or attitude of the markers 3 in the real space has been completed for all the pieces of relative relation information. If there are any pieces of relative relation information not determined, the processing proceeds to step S103. This means that the processing steps shown in step S103 to step S106 are repeated until the determination of change in position and attitude of the markers 3 in the real space has been completed for all the pieces of relative relation information acquired in step S102.

In step S107 and step S108, the marker coordinate system and relative relation information relating to the removed marker 3 are deleted. The deletion unit 63 refers to the relative relation information acquired in the previous frame. When relative relation information corresponding to this relative relation information has not been acquired in the current frame, and when even though a position where a marker 3 should exist according to this relative relation information is contained in the captured image, the marker 3 has not been detected at this position, the deletion unit 63 determines that the marker 3 has been removed (step S107). When the marker 3 is determined to have been removed, the deletion unit 63 deletes the marker coordinate system and relative relation information relating to the marker 3 determined to have been removed in step S107 from the storage unit 59 (step S108). Then, the processing shown in this flowchart is terminated.

When it is not determined that the marker 3 has been removed, the processing shown in this flowchart is terminated. For example, when even though the corresponding relative relation information has not been acquired in the current frame, the position where the marker 3 should exist is not contained in the captured image, it is likely that the marker 3 has simply not been captured in the captured image and hence has not been removed. Thus the deletion unit 63 does not delete the marker coordinate system.

FIG. 10 is a flowchart illustrating a flow of estimation processing according to the present embodiment. This flowchart illustrates details of the estimation processing shown in step S005 of FIG. 7.

In step S201, a marker 3 that is not captured in the captured image is extracted. The information processing unit 31 extracts, from among the markers 3 held by the storage unit 59, a marker 3 which is not captured in the captured image by extracting a marker 3 which relates to a marker coordinate system whose related relative relation information and marker coordinate system have not been updated in the aforementioned step S104. As described before in relation to step S104, it is managed with the use of an update flag whether or not each of the marker coordinate systems is updated. Therefore, a marker related to a marker coordinate system whose update flag is set to be "FALSE" can be determined to be a marker which is not captured in the captured image. Since a removed marker has already been deleted in step S108, it is not extracted. The processing then proceeds to step S201.

The information processing unit 31 may extract a marker 3 which is not captured in the captured image but held in the storage unit 59, by comparing the marker 3 detected in step S002 with the markers 3 held in the storage unit 59. The comparison of the markers 3 may be performed by comparing the marker 3 contained in the captured image with marker images held in the marker information 582 with the use of an image recognition engine, or may be performed by comparing the marker coordinate system related to the marker 3 contained in the captured image with the marker coordinate systems held in the storage unit 59.

In step S202, it is determined whether or not there is any marker 3 not captured in the captured image. The information processing unit 31 determines whether or not there is any marker 3 not captured in the captured image by referring to the result of the extraction in step S201. When it is determined there exists a marker 3 not captured in the captured image, the processing proceeds to step S203. When it is determined there exists no marker 3 not captured in the captured image (in other words, all the markers 3 are captured in the captured image), the processing illustrated in this flowchart is terminated.

In step S203, a marker coordinate system related to the marker 3 not captured in the captured image is estimated. The estimation unit 56 estimates a marker coordinate system related to the marker 3 not captured in the captured image and extracted in step S201 (hereafter, referred to as the "marker coordinate system to be estimated"), based on the marker coordinate systems related to the markers 3 captured in the captured image and the relative relation information indicating a relative relation of these marker coordinate systems. More specifically, the estimation unit 56 acquires from the storage unit 59 a conversion matrix which is relative relation information relating to the marker coordinate system of the captured marker 3 and the marker coordinate system to be estimated, and estimates the marker coordinate system to be estimated by performing calculation of the coordinate conversion. The processing illustrated in this flowchart is then terminated.

Subsequently, the game progress processing shown in step S006 of FIG. 7 and the display processing shown in step S007 are performed.

According to the present embodiment, as described above, a marker coordinate system related to a marker 3 not contained in the captured image is estimated, which makes it possible to render and display a virtual object arranged in the marker coordinate system related to the marker 3 not contained in the captured image.

Figure 11:
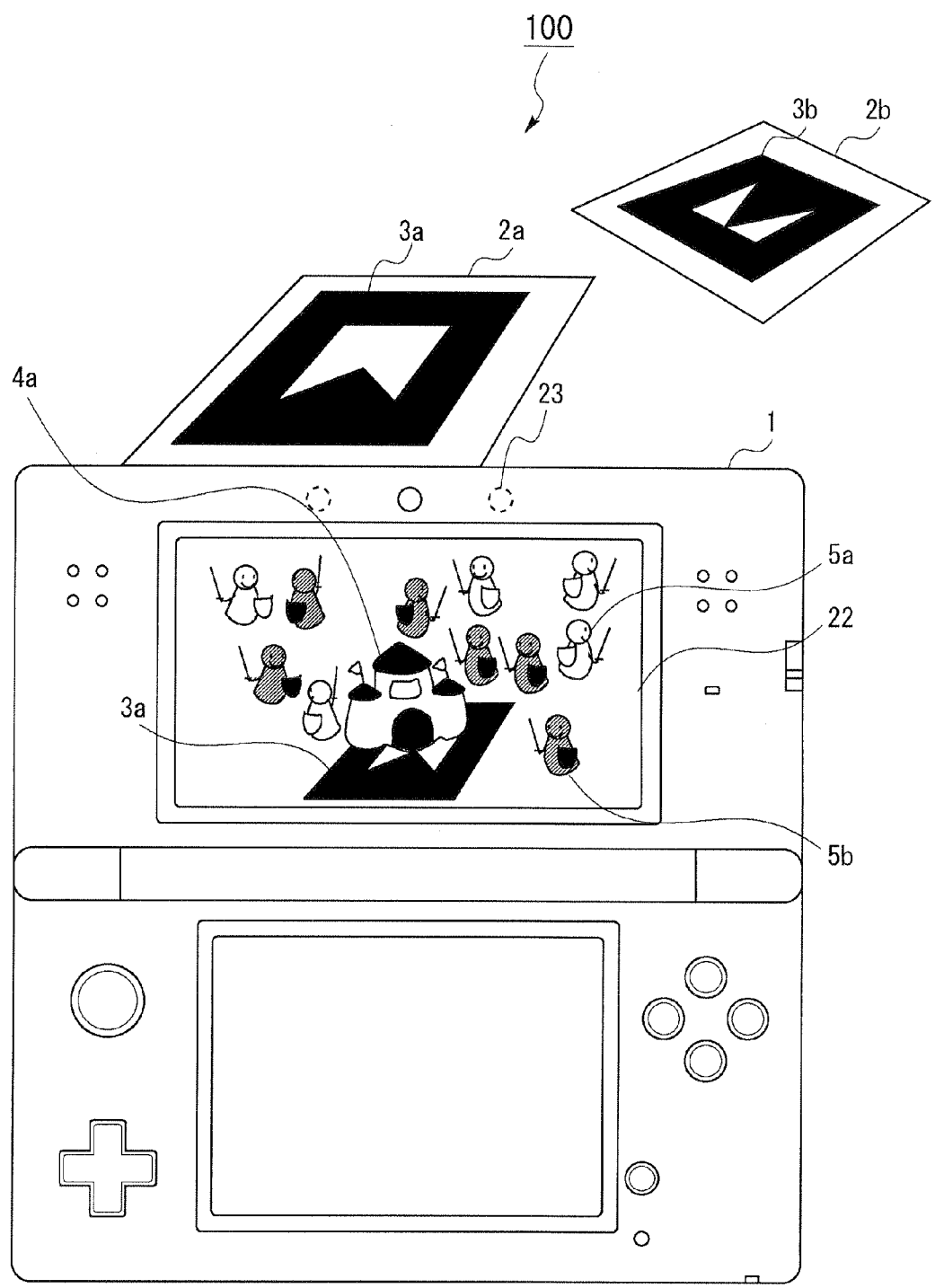
FIG. 11 shows an example non-limiting diagram illustrating a state of the game system according to the embodiment when the marker is not within the imaging range of a real camera.

FIG. 11 is a diagram illustrating the game system 100 according to the present embodiment which is in a state in which the marker 3b is not within the imaging range of the real camera 23. As is seen from the example shown in FIG. 11, no marker 3b is contained in the captured image. Therefore, the feature detection unit 52 is not able to detect the marker 3b from the captured image, and the reference acquisition unit 53 is not able to acquire the marker coordinate system MB. However, the game device 1 according to the present embodiment has preliminarily acquired a conversion matrix (relative relation information) for performing coordinate conversion from the marker coordinate system MA to the marker coordinate system MB, at the time when the marker 3*a* and the marker 3*b* are imaged at the same time. Therefore, the estimation unit 56 is able to estimate the marker coordinate system MB based on the marker coordinate system MA acquired by the reference acquisition unit 53. It is thus made possible, in the example shown in FIG. 11, that the character object 5*b* which is arranged in the marker coordinate system MB is rendered by the rendering unit 57, combined with the captured image by the display control unit 58, and displayed by the display 22.

Although the description above has been made in terms of an example in which the game progress processing is performed by the game device 1, some of the processing steps in the game progress processing may be performed by other devices. For example, when the game device 1 communicates with another device (e.g. a server or another game device), the processing steps in the aforementioned game progress processing may be performed by the game device 1 in cooperation with said another device. For example, said another device may take over the processing steps of the feature detection unit 52, the reference acquisition unit 53, and the relative relation information acquisition unit 54. Thus, the game progress processing can be performed in the same manner as described in the above, by causing a separate device to take over at least some of the processing steps of the game progress processing. In this manner, the aforementioned game progress processing can be performed by a single processor or a cooperation of a plurality of processors included in an information processing system constituted by at least one information processing device. Although, in the embodiment described above, the processing of the flowchart above is performed by the information processing unit 31 of the game device 1 executing the predetermined program, a part or the entire of the processing may be performed by a dedicated circuit provided in the game device 1.

The shape of the game device 1, the shapes, numbers, and locations of the operating buttons 14, the analog stick 15, and the touch panel 13 provided in the game device 1 are illustrative only, and it should be understood that this disclosure can be realized by other shapes, numbers, and locations as well. Further, the sequence of processing steps, the set values, and the values used for determination described above are illustrative only, and this disclosure can be realized by other sequence or other values.

The game program described above may be supplied to the game device 1 not only via an external storage medium such as the external memory 45 or the data storing external memory 46, but also via wired or wireless communication lines. Alternatively, the program may be preliminarily recorded in a non-volatile storage device provided within the game device 1. The information storage medium for storing the program may be not only a non-volatile memory, but also a CD-ROM, a DVD, or other optical disc-type storage medium, a flexible disc, a hard disc, a magneto-optical disc, magnetic tape, or the like. The information storage medium storing the program may be a volatile memory for temporarily storing the program. Such an external storage medium can be considered as a recording medium that is readable by a computer or the like. For example, it is possible to cause a computer or the like to provide the functions as described above by causing the computer or the like to load and execute the program on this recording medium.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An image processing system comprising:
   a component marked with a feature whose position and attitude relative to an imaging device can be specified by being imaged by the imaging device; and
   an image processing apparatus connected to the imaging device, the image processing apparatus comprising a computer processor configured to perform at least:
      acquiring a captured image captured by the imaging device;
      detecting the feature from the captured image;
      acquiring a position/attitude reference based on the detected feature, the reference being used as a reference for indicating a position and attitude of the detected feature in a space imaged by the imaging device;
      acquiring, based on a first captured image from which a plurality of features is detected, relative relation information indicating a relative relation in position and attitude among a plurality of position/attitude references acquired for each of the plurality of features;
      storing the relative relation information; and
      estimating the position/attitude references of one or more features which is detected from the first captured image and is not detected from a second captured image which is a new captured image, based on the relative relation information and one of the plurality of position/attitude references of another feature which is detected from the first and second captured image.

2. The image processing system according to claim 1, wherein the computer processor further performs:
   determining whether or not the acquired relative relation information is relative relation information corresponding to the stored relative relation information; and
   updating the stored relative relation information using the acquired relative relation information, when it is determined that the acquired relative relation information is relative relation information corresponding to the stored relative relation information.

3. The image processing system according to claim 2, wherein the computer processor further performs storing the acquired relative relation information when it is not determined that the acquired relative relation information is relative relation information corresponding to the stored relative relation information.

4. The image processing system according to claim 1, wherein the computer processor further performs deleting the relative relation information satisfying a predetermined condition from the relative relation information.

5. The image processing system according to claim 1, wherein the computer processor further performs rendering a virtual space image by arranging a virtual camera in a virtual space, arranging, in the virtual space, a virtual object whose position and attitude are determined according to the position/attitude reference, and generating an image of the virtual space as viewed from the virtual camera.

6. The image processing system according to claim 5, wherein the computer processor further performs generating a composite image by overlapping the image of the virtual space with the first captured image and causing a display device to display the composite image.

7. The image processing system according to claim 1, wherein the computer processor further performs predetermined processing so that time in a virtual space advances with passage of real time.

8. An image processing method comprising:
acquiring a captured image captured by an imaging device;
detecting, from the captured image, a feature whose position and attitude relative to the imaging device in a space imaged by the imaging device can be specified;
acquiring, based on the detected feature, a position/attitude reference which is used as a reference indicating a position and attitude of the detected feature in the space imaged by the imaging device;
acquiring, based on a first captured image from which a plurality of features is detected, relative relation information indicating a relative relation in position and attitude among a plurality of position/attitude references acquired for each of the plurality of features;
storing the relative relation information; and
estimating the position/attitude references of one or more features which is detected from the first captured image and is not detected from a second captured image which is a new captured image, based on the relative relation information and one of the plurality of position/attitude references of another feature which is detected from the first and second captured image.

9. An image processing apparatus comprising a computer processor configured to perform at least:
acquiring a captured image captured by an imaging device;
detecting, from the captured image, a feature whose position and attitude relative to the imaging device in a space imaged by the imaging device can be specified;
acquiring, based on the detected feature, a position/attitude reference which is used as a reference indicating a position and attitude of the detected feature in the space imaged by the imaging device;
acquiring, based on a first captured image from which a plurality of features is detected, relative relation information indicating a relative relation in position and attitude among a plurality of position/attitude references acquired for each of the plurality of features;
storing the relative relation information; and
estimating the position/attitude references of one or more features which is detected from the first captured image and is not detected from a second captured image which is a new captured image, based on the relative relation information and one of the plurality of position/attitude references of another feature which is detected from the first and second captured image.

10. A non-transitory computer-readable medium on which an image processing program is recorded, the image processing program causing a computer to perform at least:
acquiring a captured image captured by an imaging device;
detecting, from the captured image, a feature whose position and attitude relative to the imaging device in a space imaged by the imaging device can be specified;
acquiring, based on the detected feature, a position/attitude reference which is used as a reference indicating a position and attitude of the detected feature in the space imaged by the imaging device;
acquiring, based on a first captured image from which a plurality of features is detected, relative relation information indicating a relative relation in position and attitude among a plurality of position/attitude references acquired for each of the plurality of features;
storing the relative relation information; and
estimating the position/attitude references of one or more features which is detected from the first captured image and is not detected from a second captured image which is a new captured image, based on the relative relation information and one of the plurality of position/attitude references of another feature which is detected from the first and second captured image.

\* \* \* \* \*